United States Patent [19]
McConaughy

[11] Patent Number: 5,865,945
[45] Date of Patent: Feb. 2, 1999

[54] PRESSURE SENSITIVE FILM APPLICATOR TOOL HANDLE

[76] Inventor: Drew B. McConaughy, 172 Lincoln Cir., Louisville, Colo. 80027

[21] Appl. No.: 961,296

[22] Filed: Oct. 30, 1997

[51] Int. Cl.⁶ .................................................. B32B 31/00
[52] U.S. Cl. ................................................ 156/579; 7/167
[58] Field of Search ............................... 156/579; 7/167; 81/489, 491; D8/71, 107, 300

[56] References Cited

U.S. PATENT DOCUMENTS

| | | | |
|---|---|---|---|
| Re. 34,194 | 3/1993 | Stowell et al. | 16/111 R |
| 2,800,672 | 7/1957 | Gilyan | 15/105 |
| 3,674,610 | 7/1972 | Bennett | 156/579 |
| 5,001,796 | 3/1991 | Desjardins | 7/105 |
| 5,008,970 | 4/1991 | Tsai | 15/236.01 |

*Primary Examiner*—James Engel
*Attorney, Agent, or Firm*—Jay R. Beyer

[57] ABSTRACT

A handle for use with a pressure sensitive film applicator tool includes a main body having a shape that configured to be easily gripped by a users hand. The applicator tool is a specifically configured double edged squeegee designed to apply pressure sensitive films to a substrate. The applicator tool has two blade portions formed on opposite longitudinal edges of the applicator tool. The handle includes a receiving arrangement for receiving one of the blade portions of the applicator tool. The handle also includes a grip arrangement for gripping the applicator tool and holding the applicator tool within the handle when one of the blade portions of the applicator tool is positioned within the receiving arrangement of the handle.

20 Claims, 2 Drawing Sheets

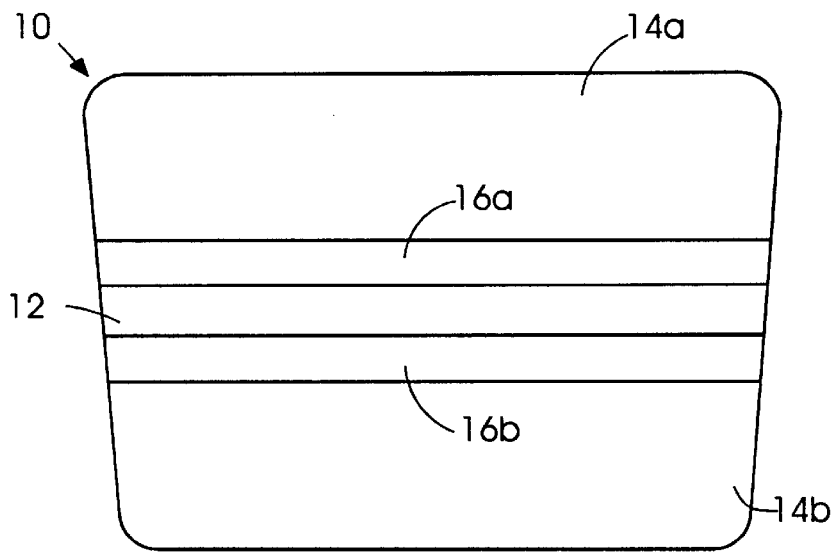
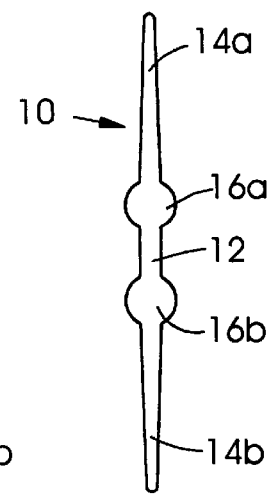
Figure 1A
Figure 1B
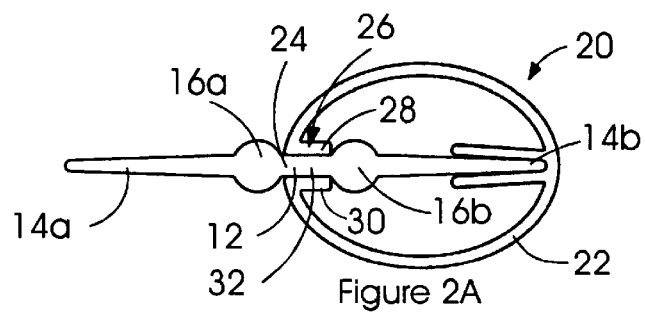
Figure 2A
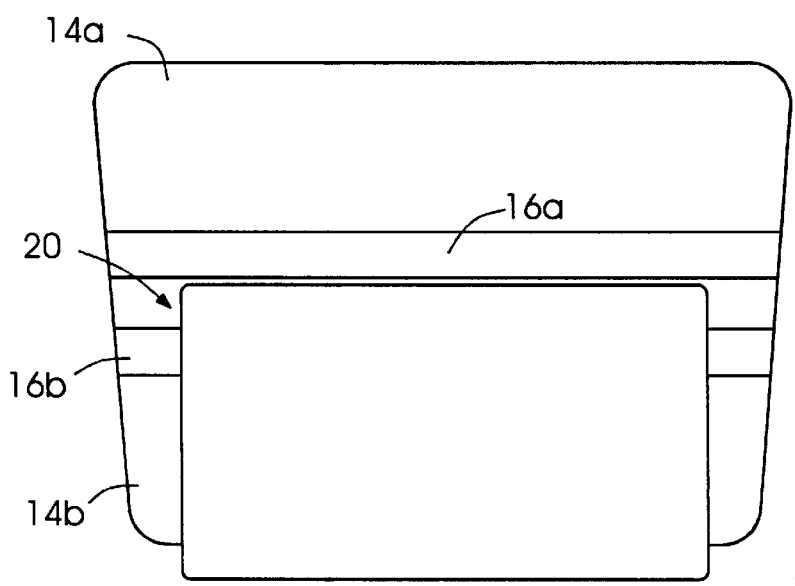
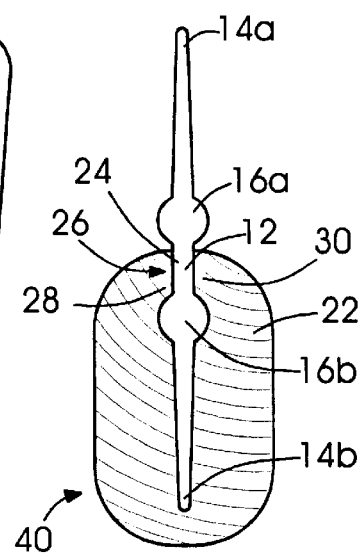
Figure 2B
Figure 3

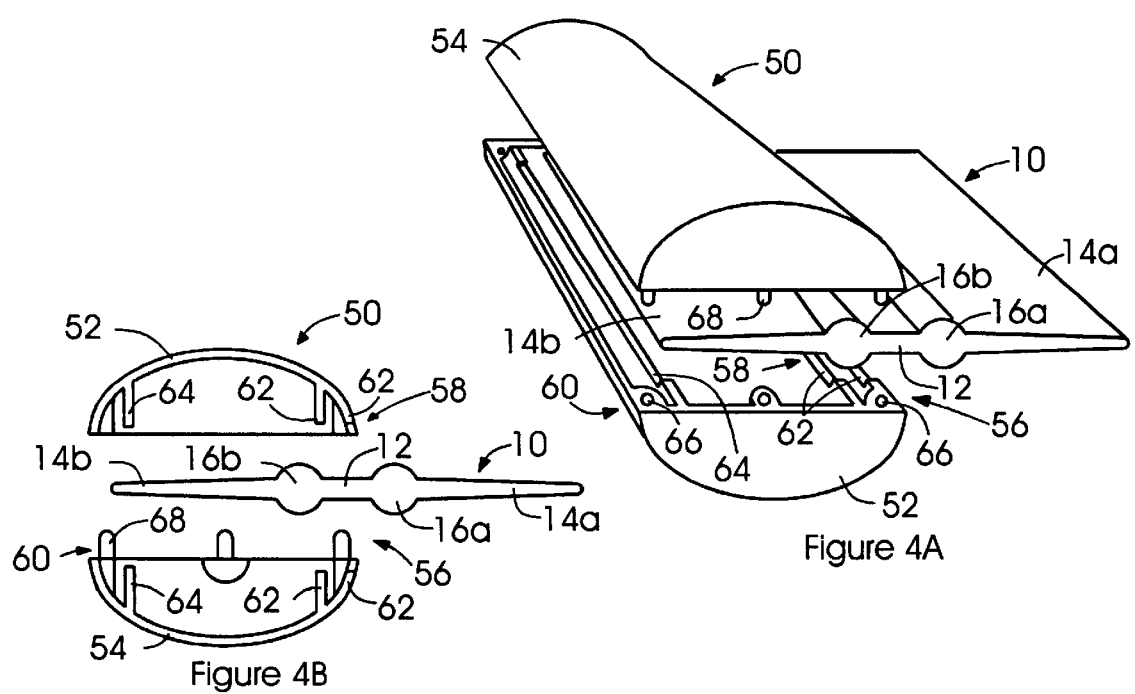
Figure 4A
Figure 4B
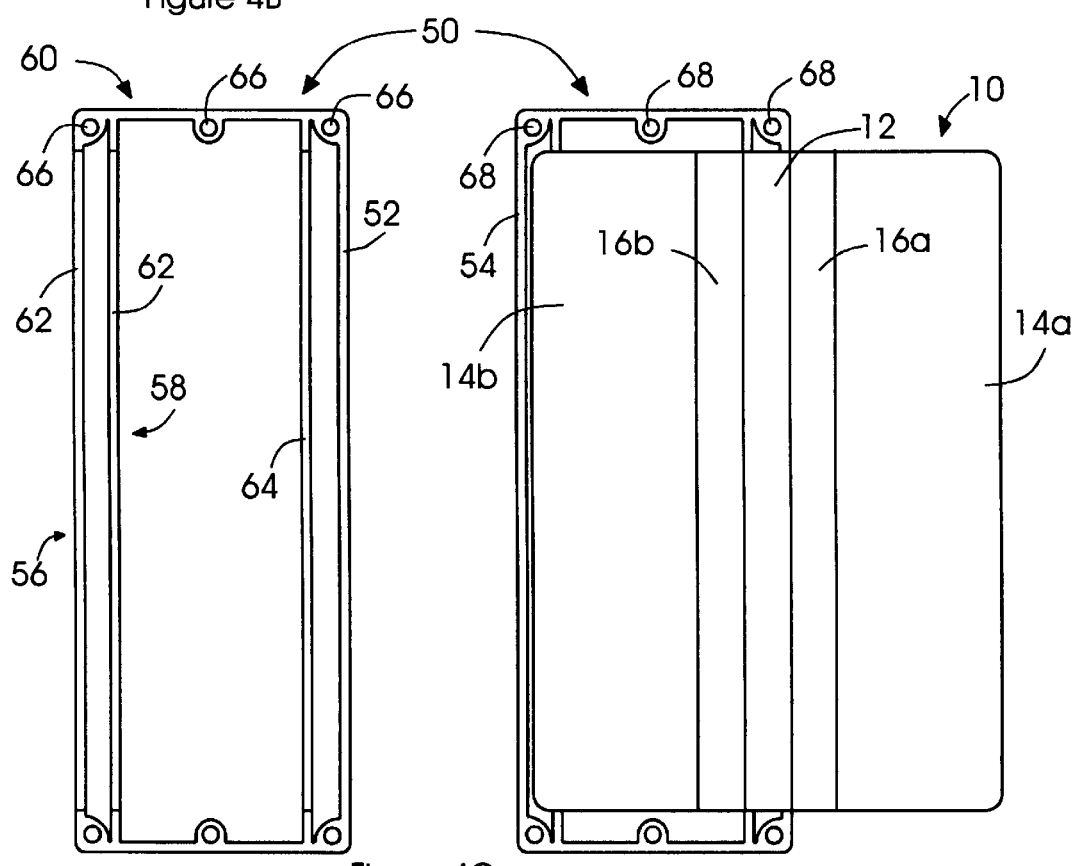
Figure 4C

PRESSURE SENSITIVE FILM APPLICATOR TOOL HANDLE

BACKGROUND OF THE INVENTION

The present invention relates generally to pressure sensitive film applicator tools used to apply pressure sensitive films to a substrate such as a sign face, window, panel, or other base. More specifically, the invention relates to a removable and reusable handle for use with a pressure sensitive film applicator tool.

When applying pressure sensitive films to a substrate, an applicator tool is typically used to apply the film to the substrate. This pressure sensitive film material typically comes in rolls and may be purchased from several pressure sensitive film manufacturers who provide pressure sensitive film material for a variety of purposes. The process of applying the pressure sensitive film to the substrate is typically accomplished using a pressure sensitive film applicator tool. As is known by those skilled in the art, the applicator tool is used to squeeze any air bubbles out from between the vinyl material and the substrate as the pressure sensitive film is applied to the substrate. Often, the manufactures of the pressure sensitive film material provide the pressure sensitive film applicator tools to the user free with the purchase of rolls of pressure sensitive film material.

One specific example of an industry that uses pressure sensitive films is the sign industry. In the sign industry, the practice of applying pressure sensitive films to a sign face in order to provide a desired sign face design has become a common method of producing a sign. In this method, letters and other design features of a sign face are cut out from a thin sheet of vinyl material. This vinyl material typically comes in rolls and may be purchased from several vinyl sheet manufacturers who provide vinyl sheet material specifically for this purpose. After the letters and other design features of the sign have been cut out from sheets of vinyl material, they are applied to a sign face or substrate. This process of applying the vinyl material to the sign face is typically accomplished using a pressure sensitive film applicator tool. As is known by those skilled in the art, the applicator tool is used to squeeze any air bubbles out from between the vinyl material and the sign face as the vinyl is applied to the sign face. FIG. 1A and 1B illustrate a typical pressure sensitive film applicator tool, designated by reference numeral 10, that is commonly used in the sign industry and other industries that use pressure sensitive films.

As illustrated in FIGS. 1A and 1B, pressure sensitive film applicator tool 10 is a specifically designed, double edged squeegee type tool. Applicator tool 10 typically includes a central portion 12 which connects two flexible blade portions 14a and 14b formed on opposite sides of central portion 12. Blade portions 14a and 14b extend longitudinally along the edges of applicator tool 10. As shown best in FIG. 1B, both blade portions 14a and 14b come to a sharpened edge at the outermost longitudinal edge of blade portion 14a and 14b. As is known in the art, these sharpened edges are used to force any air bubbles from between the pressure sensitive film material and the substrate by rubbing one of the edges of the applicator tool over the pressure sensitive film material and forcing it firmly against the substrate.

Applicator tool 10 also includes a pair of spaced apart protrusions 16a and 16b which extend along the longitudinal length of central portion 12 of applicator tool 10 parallel to the longitudinal edges of the applicator tool. Protrusions 16a and 16b provide a pair of longitudinal ridges through the central portion of the tool that may be used by the user to grip the applicator tool.

One problem with this type of applicator tool is that repeated use of the tool may cause discomfort to the user. This is because the unused sharpened edge of the applicator tool typically presses against the user's palm when the user grasps the central portion of the applicator tool with a hand in order to rub the tool against the substrate. Although the sharpened edges are not typically sharp enough to cut the users hand, repeated use of the tool, as is often required by a sign maker for example, may cause substantial discomfort to the user due to the unused sharpened edge pressing against the palm of the hand of the user.

The present invention discloses a removable and reusable handle for use with a pressure sensitive film applicator tool. The handle eliminates the above described problem of discomfort to the user caused by the user having to hold onto the unused blade portion of the applicator tool during use of the tool.

SUMMARY OF THE INVENTION

As will be described in more detail hereinafter, a handle for use with a pressure sensitive film applicator tool is herein disclosed. The applicator tool is a specifically configured double edged squeegee designed to apply pressure sensitive films to a substrate. The applicator tool has two blade portions formed on opposite longitudinal edges of the applicator tool and a central portion located between the two blade portions of the applicator tool. The central portion includes a pair of spaced apart protrusions which extend along the longitudinal length of the central portion of the applicator tool parallel to the longitudinal edges of the applicator tool. The handle includes a receiving arrangement for receiving one of the blade portions of the applicator tool. The handle also includes a grip arrangement for gripping the applicator tool and holding the applicator tool within the handle when one of the blade portions of the applicator tool is positioned within the receiving arrangement of the handle.

In one embodiment, the receiving arrangement includes a slot formed into the handle. The slot has a cross sectional shape configured to slidably receive one of the blade portions of the applicator tool. The slot has a mouth including a pair of flanges. The flanges are positioned to grip the central portion of the applicator tool between the pair of spaced apart protrusions thereby acting as the grip arrangement of the handle. In this embodiment, the handle may be formed from an extruded material such as extruded aluminum or extruded plastic.

In another embodiment, the handle includes a first handle portion and a second handle portion that are fastened together to form the handle. The receiving arrangement includes recessed flanges formed into the handle portions such that the flanges form a gap between the handle portions when the handle portions are fastened together. The gap has a cross sectional shape configured to receive one of the blade portions of the applicator tool when the handle portions are fastened together around the applicator tool. The flanges are also configured to grip the central portion of the applicator tool between the pair of spaced apart protrusions on the applicator tool when the handle portions are fastened together around the applicator tool thereby acting as the grip arrangement of the handle. In this embodiment, the handle may be formed from an injection molded material such as injection molded plastic. Additionally, the handle portions may include a snap arrangement for snappably fastening the handle portions together.

BRIEF DESCRIPTION OF THE DRAWINGS

The features of the present invention may best be understood by reference to the following description of the presently preferred embodiments together with the accompanying drawings.

FIG. 1A is a diagrammatic illustration of a prior art pressure sensitive film applicator tool.

FIG. 1B is a diagrammatic cross sectional illustration of the pressure sensitive film applicator tool of FIG. 1A.

FIG. 2A is a diagrammatic cross sectional illustration of a first embodiment of a pressure sensitive film applicator tool handle designed in accordance with the invention shown mounted on a pressure sensitive film applicator tool.

FIG. 2B is a diagrammatic plan view of the handle and pressure sensitive film applicator tool of FIG. 2A.

FIG. 3 is a diagrammatic cross sectional illustration of a second embodiment of a pressure sensitive film applicator tool handle designed in accordance with the invention shown mounted on a pressure sensitive film applicator tool.

FIG. 4A is a diagrammatic perspective illustration of a third embodiment of a pressure sensitive film applicator tool handle designed in accordance with the invention shown as it is being mounted on a pressure sensitive film applicator tool.

FIG. 4B is a diagrammatic cross sectional view of the handle and pressure sensitive film applicator tool of FIG. 4A.

FIG. 4C is a diagrammatic plan view of the handle and pressure sensitive film applicator tool of FIG. 4A.

DETAILED DESCRIPTION OF THE PREFERRED EMBODIMENTS

An invention is herein described for providing a handle for use with a pressure sensitive film applicator tool such as the applicator tool illustrated in FIGS. 1A and 1B. However, in view of this description, it will be obvious to one skilled in the art that the present invention may be embodied in a wide variety of specific configurations. In order not to unnecessarily obscure the present invention, known processes for applying pressure sensitive films such as the processes of applying pressure sensitive films to a sign face will not be described in detail. Also, the various methods of manufacturing a handle in accordance with the invention will not be described in detail. These methods are known to those skilled in the art.

Referring initially to FIG. 2A and 2B, a first embodiment of a handle 20, designed in accordance with the invention, will be described. As will be described in more detail hereinafter, handle 20 is configured to attach to a pressure sensitive film applicator tool such as the one shown in FIGS. 1A and 1B. As illustrated best in FIG. 2A, handle 20 has a main body 22 that is configured to have a shape that is easily and comfortably gripped by a user's hand. In the embodiment shown, the handle has a generally oval cross sectional shape. However, it should be understood that the generally oval shape shown is not a requirement of the invention. Instead, the handle may take on a wide variety of specific shapes so long as the user is able to grip the handle comfortably and easily.

In accordance with the invention, handle 20 includes a receiving arrangement 23 for receiving one of the blade portions of the applicator tool. In this embodiment, this arrangement includes a slot 24 formed into main body 22 of handle 20. Slot 24 has a cross sectional shape that is configured to slidably receive one of the blade portions of a pressure sensitive film applicator tool as illustrated in FIGS. 2A and 2B. The applicator tool is a conventional pressure sensitive film applicator tool such as applicator tool 10 described above in the background.

Also in accordance with the invention, handle 20 further includes a grip arrangement 26 formed into the main body of the handle for gripping pressure sensitive film applicator tool 10 and holding it within the handle when one of the blade portions (in this case blade portion 14b) of the applicator tool is positioned within slot 24 of the handle. In this embodiment, grip arrangement 26 includes a pair of flanges 28 and 30 formed at opposite sides of a mouth 32 of slot 24. Flanges 28 and 30 are positioned such that they grip central portion 12 of applicator tool 10 between the spaced apart protrusions 16a and 16b thereby holding applicator tool 10 within handle 20.

In the embodiment shown in FIGS. 2A and 2B, handle 20 is formed from an extruded material. The extruded material may be aluminum, plastic, or any other material that can be extruded into the desired shape. As mentioned above, the cross sectional shape of the handle is configured to slidably receive the applicator tool and hold the applicator tool within the handle using grip arrangement 26. In this case, this is accomplished by sliding handle 20 from one side of the applicator tool along the longitudinal length of the tool over one of the blade portions (in this case blade portion 14b) and the central portion 12 of the applicator tool. This causes central portion 12 and blade portion 14b to nest within slot 24 of handle 20. With this arrangement, flanges 28 and 30 end up positioned on opposite sides of central portion 12 between protrusions 16a and 16b. This allows flanges 28 and 30 to securely grip applicator tool 10 within handle 20.

Although handle 20 has been described as being formed by extruding a material such as aluminum or plastic, this is not a requirement. Instead, it should be understood that the present invention would equally apply to a handle produced using any other appropriate method. For example, as illustrated in FIG. 3, the handle may take the form of a wooden handle 40 or a handle made from some other material that has been machined to the desired cross sectional shape. Using the same reference numerals for like components of the handle, handle 40 will be briefly described.

Handle 40 is very similar in configuration to handle 20. As described above for handle 20, handle 40 includes a receiving arrangement 23 for receiving one of the blade portions of the applicator tool. In this case, the receiving arrangement takes the form of slot 24 formed into handle 40. As shown in FIG. 3, slot 24 has a cross sectional shape that is able to slidably receive blade portion 14b and central portion 12 of applicator tool 10. As also described above, handle 40 includes a grip arrangement 26 for gripping the central portion 12 of tool 10. Grip arrangement 26 includes flanges 28 and 30 located on opposites sides of mouth 30 of slot 24. Flanges 28 and 30 grip applicator tool 10 on opposite sides of central portion 12 of applicator tool 10 between protrusions 16a and 16b. The main difference between handle 20 and handle 40 is that handle 40 is formed from a solid piece of material that is machined to the desired cross sectional shape whereas handle 20 is extruded to form a desired cross sectional shape.

Although the handle has been described and illustrated as having a certain cross sectional shape that remains constant over the longitudinal length of the handle, this is not a requirement of the invention. Instead, the handle may take on any shape so long as it is able to attach to a pressure sensitive film applicator tool and allow the user to hold the tool without having the user's palm exposed to the unused blade portion of the applicator tool. For Example, the handle may be fabricated from more than one component in order to form a non symmetrical overall handle that grips the applicator tool when one blade portion of the applicator tool is inserted into the handle and the handle is secured to the applicator tool. Also, although only one particular grip arrangement for securing the handle to the applicator tool has been described, it should be understood that the present invention would equally apply regardless of the specific grip arrangement used to secure the handle to the applicator tool.

FIGS. 4A, 4B, and 4C illustrate a third embodiment of a handle 50 designed in accordance with the invention. In this embodiment, handle 50 is formed from two injection molded handle portions 52 and 54 that snap or otherwise fasten together to form overall handle 50. FIG. 4A is a diagrammatic perspective view showing handle 50 as it is being attached to pressure sensitive film applicator tool 10. FIGS. 4B and 4C are respectively a cross sectional view and a plan view of handle 50 and applicator tool 10.

As illustrated in FIGS. 4A, 4B, and 4C, injection molded handle 50 includes a receiving arrangement 56 for receiving a pressure sensitive film applicator tool such as applicator tool 10 described above. Handle 50 also includes grip arrangement 58 for gripping applicator tool 10 when handle portions 52 and 54 are fastened together around applicator tool 10 using one or more fastening arrangements 60. In the embodiment shown, receiving arrangement 56 includes flanges 62 and flanges 64 molded into handle portions 52 and 54. Flanges 62 are also used to form grip arrangement 58. As shown best in FIG. 4B, flanges 62 and 64 are recessed flanges that are arranged to form gaps between handle portion 52 and 54 when handle portions 52 and 54 are fastened together using fastening arrangements 60. These gaps form receiving arrangement 56 for receiving applicator tool 10. Flanges 62 are also positioned such that they form grip arrangement 58 by gripping central portion 12 of applicator tool 10 between protrusions 16a and 16b when handle portions 52 and 54 are fastened together around applicator tool 10.

Fastening arrangements 60 are illustrated in FIGS. 4A, 4B, and 4C as being a plurality of openings 66 formed in to handle portion 52 and a plurality of protrusions 68 formed into handle portion 54. In this embodiment, protrusions 68 are designed to fit tightly into openings 66 such that handle portion 54 may be snapped together with handle portion 52 by simply aligning the handle portions and pressing them together. Although fastening arrangements 60 have been described as being snaps that snap the handle portions together, this is not a requirement. Instead, any conventional fastening arrangement may be used such as one or more screws, or any other type of fasteners.

Although only three specific embodiments of a handle in accordance with the invention have been described in detail, it should be understood that the present invention may take on a wide variety of specific configurations and still remain within the scope of the present invention. Therefore, the present examples are to be considered as illustrative and not restrictive, and the invention is not to be limited to the details given herein, but may be modified within the scope of the appended claims.

What is claimed is:

1. A handle for use with a pressure sensitive film applicator tool, the applicator tool being a specifically configured double edged squeegee designed to apply pressure sensitive films to a substrate, the applicator tool having two blade portions formed on opposite longitudinal edges of the applicator tool, the applicator tool including a central portion located between the two blade portions of the applicator tool, the central portion including a pair of spaced apart protrusions which extend along the longitudinal length of the central portion of the applicator tool substantially parallel to the longitudinal edges of the applicator tool, the handle comprising:

a main body having a shape which is configured to be easily gripped by a users hand, the main body including a slot formed longitudinally through the main body of the handle, the slot having a cross sectional shape configured to slidably receive one of the blade portions of the applicator tool, the slot in the main body of the handle having a cross sectional shape which defines a mouth of the slot, the mouth of the slot having a grip means located at the mouth of the slot such that the grip means grips the central portion of the applicator tool between the pair of spaced apart protrusions in the central portion of the applicator tool when one of the blade portions of the applicator tool is positioned within the slot in the main body of the handle.

2. A handle according to claim 1 wherein the mouth of the slot has a pair of flanges located on opposite sides of the mouth such that the flanges grip the central portion of the applicator tool between the pair of spaced apart protrusions in the central portion of the applicator tool when one of the blade portions of the applicator tool is positioned within the slot in the main body of the handle, the flanges forming the grip means for gripping the applicator tool.

3. A handle according to claim 1 wherein the handle is formed from an extruded material.

4. A handle according to claim 3 wherein the handle is formed from extruded aluminum.

5. A handle according to claim 3 wherein the handle is formed from extruded plastic.

6. A handle for use with a pressure sensitive film applicator tool, the applicator tool being a specifically configured double edged squeegee designed to apply pressure sensitive films to a substrate, the applicator tool having two blade portions formed on opposite longitudinal edges of the applicator tool, the applicator tool including a central portion located between the two blade portions of the applicator tool, the central portion including a pair of spaced apart protrusions which extend along the longitudinal length of the central portion of the applicator tool substantially parallel to the longitudinal edges of the applicator tool, the handle comprising:

a) receiving means for receiving one of the blade portions of the applicator tool and b) grip means for gripping the applicator tool and holding the applicator tool within the handle when one of the blade portions of the applicator tool is positioned within the receiving means of the handle, the grip means of the handle being configured to grip the central portion of the applicator tool between the pair of spaced apart protrusions in the central portion of the applicator tool when one of the blade portions of the applicator tool is positioned within the receiving means of the handle.

7. A handle according to claim 6 wherein the receiving means includes a slot formed into the handle, the slot having a cross sectional shape configured to slidably receive one of the blade portions of the applicator tool, the slot having a mouth including a pair of flanges, the flanges being positioned to grip the central portion of the applicator tool between the pair of spaced apart protrusions thereby acting as the grip means of the handle.

8. A handle according to claim 6 wherein the handle is formed from an extruded material.

9. A handle according to claim 8 wherein the handle is formed from extruded aluminum.

10. A handle according to claim 8 wherein the handle is formed from extruded plastic.

11. A handle according to claim 6 wherein the handle includes a first handle portion and a second handle portion that are fastened together to form the handle and wherein the receiving means includes recessed flanges formed into the handle portions such that the flanges form a gap between the handle portions when the handle portions are fastened together, the gap having a cross sectional shape configured to receive one of the blade portions of the applicator tool when the handle portions are fastened together around the applicator tool, the flanges also being configured to grip the central portion of the applicator tool between the pair of spaced apart protrusions on the applicator tool when the handle portions are fastened together around the applicator tool thereby acting as the grip means of the handle.

12. A handle according to claim 11 wherein the handle is formed from an injection molded material.

13. A handle according to claim 12 wherein the handle is formed from injection molded plastic.

14. A handle according to claim 11 wherein the handle portions include snap means for snappably fastening the handle portions together.

15. A pressure sensitive film applicator tool comprising:
 a) a specifically configured double edged squeegee having two blade portions formed on opposite longitudinal edges of the squeegee, the squeegee including a central portion located between the two blade portions of the squeegee, the central portion including a pair of spaced apart protrusions which extend along the longitudinal length of the central portion of the squeegee substantially parallel to the longitudinal edges of the squeegee; and
 b) a handle including a receiving means for receiving one of the blade portions of the squeegee and a grip means for gripping the squeegee and holding the squeegee within the handle when one of the blade portions of the squeegee is positioned within the receiving means of the handle, the grip means of the handle being configured to grip the central portion of the squeegee between the pair of spaced apart protrusions in the central portion of the squeegee when one of the blade portions of the squeegee is positioned within the receiving means of the handle.

16. A tool according to claim 15 wherein the receiving means of the handle includes a slot formed into the handle, the slot having a cross sectional shape configured to slidably receive one of the blade portions of the squeegee, the slot having a mouth including a pair of flanges, the flanges being positioned to grip the central portion of the squeegee between the pair of spaced apart protrusions thereby acting as the grip means of the handle.

17. A tool according to claim 15 wherein the handle is formed from an extruded material.

18. A tool according to claim 15 wherein the handle includes a first handle portion and a second handle portion that are fastened together to form the handle and wherein the receiving means includes recessed flanges formed into the handle portions such that the flanges form a gap between the handle portions when the handle portions are fastened together, the gap having a cross sectional shape configured to receive one of the blade portions of the squeegee when the handle portions are fastened together around the squeegee, the flanges also being configured to grip the central portion of the squeegee between the pair of spaced apart protrusions on the squeegee when the handle portions are fastened together around the squeegee thereby acting as the grip means of the handle.

19. A tool according to claim 18 wherein the handle is formed from an injection molded material.

20. A handle according to claim 19 wherein the handle portions include snap means for snappably fastening the handle portions together.

* * * * *